United States Patent
Zhang

(10) Patent No.: US 11,444,714 B2
(45) Date of Patent: *Sep. 13, 2022

(54) METHOD FOR DETECTING SYNCHRONIZATION SIGNAL BLOCK, AND METHOD, APPARATUS AND SYSTEM FOR TRANSMITTING SYNCHRONIZATION SIGNAL BLOCK

(71) Applicant: GUANGDONG OPPO MOBILE TELECOMMUNICATIONS CORP., LTD., Guangdong (CN)

(72) Inventor: Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/101,541

(22) Filed: Nov. 23, 2020

(65) Prior Publication Data

US 2021/0075535 A1 Mar. 11, 2021

Related U.S. Application Data

(63) Continuation of application No. 16/467,949, filed as application No. PCT/CN2017/077142 on Mar. 17, 2017, now Pat. No. 10,880,031.

(51) Int. Cl.
*H04J 11/00* (2006.01)

(52) U.S. Cl.
CPC ....... *H04J 11/0073* (2013.01); *H04J 11/0076* (2013.01); *H04J 11/0079* (2013.01)

(58) Field of Classification Search
None
See application file for complete search history.

(56) References Cited

U.S. PATENT DOCUMENTS

2016/0277225 A1 9/2016 Frenne et al.
2017/0012692 A1 1/2017 Kim et al.
(Continued)

FOREIGN PATENT DOCUMENTS

CN 103795668 5/2014
CN 105453456 A 3/2016
(Continued)

OTHER PUBLICATIONS

CNIPA, First Office Action for CN Application No. 202011001601. 6, dated Oct. 11, 2021.
(Continued)

*Primary Examiner* — Rebecca E Song
(74) *Attorney, Agent, or Firm* — Hodgson Russ LLP

(57) ABSTRACT

The present disclosure is related to a terminal device and a network device. The terminal device includes: a receiver configured to receive a first synchronization signal block transmitted by an access network device, wherein the first synchronization signal block comprises a physical broadcast channel (PBCH); and a processor configured to determine a location of a frequency resource of a second synchronization signal block according to preset information comprised in the physical broadcast channel (PBCH), wherein the first synchronization signal block and the second synchronization signal block carry same information.

19 Claims, 6 Drawing Sheets

(56) References Cited

U.S. PATENT DOCUMENTS

2018/0270772 A1* 9/2018 Ly .................... H04L 5/001
2019/0297560 A1* 9/2019 Gao ................. H04W 72/044

FOREIGN PATENT DOCUMENTS

| CN | 106304346 | 1/2017 | | |
|---|---|---|---|---|
| WO | 2016203290 | 12/2016 | | |
| WO | WO-2016203290 A1 * | 12/2016 | ............. | H04L 43/16 |

OTHER PUBLICATIONS

EPO, Extended European Search Report for EP Application No. 17900757.0, dated Nov. 14, 2019.
EPO, Extended European Search Report for EP Application No. 21154611.4, dated May 18, 2021.
CNIPA, Second Office Action for CN Application No. 202011001601.6, dated Dec. 16, 2021.
CNIPA, Office Action issued in CN Application No. 202011003317.2, dated Jun. 2, 2022.
NTT Docomo, Inc., 3GPP TSG RAN WG1, Meeting #88, R1-1702823, "Discussion on SS Burst Set Composition and SS Block Index Indication for NR", Feb. 2017.

* cited by examiner

METHOD FOR DETECTING SYNCHRONIZATION SIGNAL BLOCK, AND METHOD, APPARATUS AND SYSTEM FOR TRANSMITTING SYNCHRONIZATION SIGNAL BLOCK

CROSS-REFERENCE TO RELATED APPLICATIONS

This application is a continuation of U.S. application Ser. No. 16/467,949, filed Jun. 7, 2019, which is a U.S. national phase entry of International Application No. PCT/CN2017/077142, filed Mar. 17, 2017, the entire disclosures of which are incorporated herein by reference in their entireties.

TECHNICAL FIELD

Embodiments of the present disclosure relate to the field of communications, and in particular, to a method for detecting a synchronization signal block, and a method, a device and a system for transmitting synchronization signal block.

BACKGROUND

In a long-term evolution (LTE) system, a base station transmits a synchronization signal by using an omni-directional transmission technology, so that a terminal establishes synchronization with the base station according to the synchronization signal, and accesses the cell.

In a 5th generation mobile communication (5G) system, since the base station and the terminal use a high frequency band of 6 GHz or higher, the base station will send a signal by means of a beam scanning in order to solve a problem of high frequency signal poor coverage and large attenuation. Therefore, in the 5G system, the base station will use different beams to transmit a synchronization signal block (SS Block) in different beam scanning directions. The synchronization signal block includes a primary synchronization signal (PSS), a secondary synchronization signal (SSS), and a synchronization channel. After the terminal receives the synchronization signal block from the corresponding beam scanning direction, the terminal detects the synchronization signal block, and then completes synchronization and accesses the cell.

In order to improve access performance of the terminal, the terminal needs to perform joint detection on the synchronization signal blocks including same information. However, in related arts, since the terminal cannot identify the synchronization signal blocks including the same information, the joint detection cannot be performed, thereby affecting the access performance of the terminal.

SUMMARY

Embodiments of the present disclosure provide a method for detecting a synchronization signal block, and a method, device and system for transmitting synchronization signal block. The technical solutions are as follows:

According to a first aspect of embodiments of the present disclosure, a method for detecting a synchronization signal block is provided. The method includes:

receiving, by a terminal, a first synchronization signal block transmitted by an access network device;

determining, by the terminal, a location of a time-frequency resource of a second synchronization signal block according to preset information included in the first synchronization signal block, wherein the first synchronization signal block and the second synchronization signal block are sent using a same beam, or the first synchronization signal block and the second synchronization signal block carry same information; and detecting, by the terminal, the second synchronization signal block.

In an optional embodiment, the preset information includes:

a total amount of different beams used when the access network device transmits synchronization signal blocks; and/or a transmission period of synchronization signal blocks.

In an optional embodiment, the preset information includes the total amount of beams, and the transmission period is pre-agreed; or the preset information includes the transmission period, and the total amount of beam types is pre-agreed.

In an optional embodiment, determining the location of the time-frequency resource of the second synchronization signal block according to the preset information included in the first synchronization signal block includes:

calculating, by the terminal, a time domain interval between the first synchronization signal block and the second synchronization signal block according to the total amount of beams and the transmission period; and determining, by the terminal, a time domain location of the second synchronization signal block according to the time domain interval and a time domain location of the first synchronization signal block;

wherein the time domain interval is at least one of the number of sub-frames, the number of slots, the number of mini-slots, or the number of orthogonal frequency division multiplexing (OFDM) symbols.

In an optional embodiment, the preset information includes a transmission period of a synchronization signal block set where the first synchronization signal block is located, and the synchronization signal block set includes at least one group of synchronization signal blocks.

In an optional embodiment, determining the location of the time-frequency resource of the second synchronization signal block according to preset information comprised in the first synchronization signal block includes:

determining, by the terminal, the transmission period as the time domain interval between the first synchronization signal block and the second synchronization signal block; and determining, by the terminal, a time domain location of the second synchronization signal block according to the time domain interval and a time domain location of the first synchronization signal block;

wherein the time domain interval is at least one of the number of sub-frames, the number of slots, the number of mini-slots, or the number of orthogonal frequency division multiplexing (OFDM) symbols.

In an optional embodiment, the preset information includes a total amount of synchronization signal blocks in the synchronization signal block set where the first synchronization signal block is located, and the synchronization signal block set includes at least one group of synchronization signal blocks.

In an optional embodiment, determining the location of the time-frequency resource of the second synchronization signal block according to the preset information included in the first synchronization signal block includes:

determining, by the terminal, the time domain interval between the first synchronization signal block and the second synchronization signal block according to the total amount of synchronization signal blocks and a pre-agreed transmission period of synchronization signal blocks; and determining, by the terminal, a time domain location of the second synchronization signal block according to the time domain interval and the time domain location of the first synchronization signal block;

wherein the time domain interval is at least one of the number of sub-frames, the number of slots, the number of mini-slots, or the number of orthogonal frequency division multiplexing (OFDM) symbols.

In an optional embodiment, the preset information includes a first time domain index of the first synchronization signal block, and the first time domain index indicates a time domain location of the first synchronization signal block.

In an optional embodiment, the first time domain index is an index of the first synchronization signal block in a synchronization signal block set;

or, the first time domain index is an index of a time domain resource where the first synchronization signal block is located in a radio frame, a sub-frame, or a time slot;

or, the first time domain index is an index of all synchronization signal blocks where the first synchronization signal block is located in a radio frame, a sub-frame, or a time slot;

wherein the synchronization signal block set includes at least one group of synchronization signal blocks, and the time domain resource is a sub-frame, a time slot, a mini-slot or an orthogonal frequency division multiplexing OFDM symbol.

In an optional embodiment, determining the location of the time-frequency resource of the second synchronization signal block according to preset information comprised in the first synchronization signal block includes:

calculating, by the terminal, a second time domain index corresponding to the second synchronization signal block according to the first time domain index and a pre-agreed index interval; and determining, by the terminal, a time domain location of the second synchronization signal block according to the second time domain index.

In an optional embodiment, the preset information includes a frequency domain interval between the first synchronization signal block and the second synchronization signal block;

determining the location of the time-frequency resource of the second synchronization signal block according to preset information included in the first synchronization signal block further includes:

determining, by the terminal, a frequency domain location of the second synchronization signal block according to a frequency domain location of the first synchronization signal block and the frequency domain interval between the first synchronization signal block and the second synchronization signal block.

In an optional embodiment, detecting the second synchronization signal block includes:

performing, by the terminal, joint detection of a first synchronization signal in the first synchronization signal block and a second synchronization signal in the second synchronization signal block;

or, performing, by the terminal, joint detection of a first synchronization channel in the first synchronization signal block and a second synchronization channel in the second synchronization signal block;

or, detecting, by the terminal, the second synchronization signal block by using a receiving beam different from that of the first synchronization signal block.

In an optional embodiment, the first synchronization signal block includes the first synchronization signal and the first synchronization channel, and the first synchronization signal or the first synchronization channel includes the preset information.

According to a second aspect of the embodiments of the present disclosure, a method for transmitting a synchronization signal block is provided. The method includes:

transmitting, by an access network device, a first synchronization signal block to a terminal; and transmitting, by the access network device, a second synchronization signal block to the terminal, wherein the first synchronization signal block and the second synchronization signal block are sent by a same beam, or the first synchronization signal block and the second synchronization signal block carry same information;

wherein the first synchronization signal block includes preset information, and the terminal is configured to determine a location of a time-frequency resource of the second synchronization signal block according to the preset information, and detect the second synchronization signal block.

In an optional embodiment, the preset information includes:

a total amount of different beams used when the access network device transmits synchronization signal blocks;

and/or, a transmission period of synchronization signal blocks;

and/or, a transmission period of a synchronization signal block set where the first synchronization signal block is located, and the synchronization signal block set includes at least one group of synchronization signal blocks;

and/or, a total amount of synchronization signal blocks in a synchronization signal block set where the first synchronization signal block is located, and the synchronization signal block set includes at least one group of synchronization signal blocks;

and/or, a first time domain index of the first synchronization signal block, wherein the first time domain index indicates a time domain location of the first synchronization signal block;

and/or, a frequency domain interval between the first synchronization signal block and the second synchronization signal block.

According to a third aspect of the embodiments of the present disclosure, a device for detecting a synchronization signal block is provided, including at least one unit configured to implement the method for detecting a synchronization signal block provided by the first aspect or any one of the possible implementations of the first aspect.

According to a fourth aspect of the present disclosure, a device for transmitting a synchronization signal block including at least one unit configured to implement the method for transmitting a synchronization signal block provided by the second aspect or any one of the possible implementations of the second aspect.

According to a fifth aspect of the embodiments of the present disclosure, a terminal is provided. The terminal includes a processor, a memory, a transmitter and a receiver; the memory is configured to store one or more instructions to be executed by the processor, and the processor is configured to implement the method for detecting a synchronization signal block provided by the first aspect or any one of the possible implementations of the first aspect; the receiver is configured to receive the synchronization signal block, and the transmitter is configured to transmit an uplink signal.

According to a sixth aspect of the embodiments of the present disclosure, an access network device is provided. The access network device includes a processor, a memory, a transmitter and a receiver; the memory is configured to store one or more instructions to be executed by the processor, and the processor is configured to implement the method for transmitting a synchronization signal block provided by the second aspect or any one of the possible implementations of the second aspect; the receiver is configured to receive the uplink signal, and the transmitter is configured to transmit the synchronization signal block.

According to a seventh aspect of the embodiments of the present disclosure, a mobile communication system is provided, including: a terminal and an access network device.

The terminal includes the device for detecting the synchronization signal block according to the third aspect;

the access network device includes the device for transmitting a synchronization signal block according to the fourth aspect.

According to an eighth aspect of the embodiments of the present disclosure, a mobile communication system is provided, including: a terminal and an access network device.

The terminal includes the terminal according to the fifth aspect;

the access network device includes the access network device according to the sixth aspect.

According to a ninth aspect of the embodiments of the present disclosure, a computer readable medium is provided, and the computer readable medium stores one or more instructions configured to implement the method for detecting a synchronization signal block provided by the first aspect or any one of the possible implementations of the first aspect.

According to a tenth aspect of the embodiments of the present disclosure, a computer readable medium is provided, and the computer readable medium stores one or more instructions configured to implement the method for transmitting a synchronization signal block provided by the second aspect or any one of the possible implementations of the second aspect.

The beneficial effects of the technical solutions provided by the embodiments of the present disclosure are as follows:

The access network device adds the preset information to the synchronization signal block. After the terminal receives the synchronization signal block, the terminal can determine, according to the preset information, the location of a time-frequency resource of other synchronization signal blocks which carry the same information as that of the synchronization signal block or are sent using the same beam as the synchronization signal block. Thus, the present disclosure can perform joint detection of two synchronization signal blocks, thereby improving the terminal's detection performance on the synchronization signal block.

BRIEF DESCRIPTION OF THE DRAWINGS

In order to more clearly illustrate the technical solutions in the embodiments of the present disclosure, the drawings used in the description of the embodiments will be briefly described below. It is apparent that the drawings in the following description show only some of the embodiments of the present disclosure, and other drawings may be obtained by those skilled in the art without departing from the scope of the present disclosure.

DETAILED DESCRIPTION

In order to make the objectives, technical solutions and advantages of the present disclosure more clear, the embodiments of the present disclosure will be further described in detail below with reference to the accompanying drawings.

A "module" as referred to herein generally refers to program or instruction(s) stored in a memory that is capable of performing certain functions; a "unit" as referred to herein generally refers to a functional structure that is logically divided, and the "unit" can be implemented by pure hardware or a combination of hardware and software.

"Multiple" as referred to herein means two or more. The expression "and/or" describes the association relationship of associated objects and indicates that there may be three relationships. For example, A and/or B may indicate that there are three cases: A exists only, A and B exist at the same time, and B exists only. The character "/" generally indicates that the contextual objects have an "or" relationship.

Figure 1:
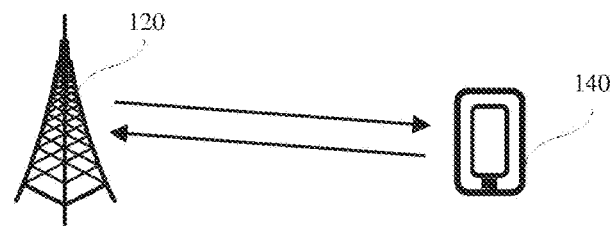
FIG. 1 is a schematic structural diagram of a mobile communication system according to an embodiment of the present disclosure.

FIG. 1 is a schematic structural diagram of a mobile communication system according to an embodiment of the present disclosure. The mobile communication system can be a 5G system, also known as a new radio (NR) system. The mobile communication system includes an access network device 120 and a terminal 140.

The access network device 120 can be a base station, and the base station can be configured to convert a received radio frame and a received IP packet into each other, and can also coordinate attribute management of an air interface. For example, the base station may be an evolutional base station (eNB or e-NodeB, evolutional Node B) in LTE, or a base station using a central distributed architecture used in the 5G system. When the access network device 120 adopts the central distributed architecture, it generally includes a central unit (CU) and at least two distributed units (DUs). Protocol stacks of a packet data convergence protocol (PDCP) layer, a radio link control (RLC) layer, and a medium access control (MAC) layer are provided in the central unit. A protocol stack of a physical layer (PHY) is provided in the distributed units. The specific implementation of the access network device 120 is not limited in the embodiments of the present disclosure.

The access network device 120 and the terminal 140 establish a wireless connection through a wireless air interface. According to an exemplary embodiment, the wireless air interface is a wireless air interface based on the fifth generation mobile communication network technology (5G) standards, for example, the wireless air interface is NR; or the wireless air interface may also be a wireless air interface based on a next generation mobile communication network technical standards that is more advanced than 5G.

The terminal 140 may be a device that provides voice and/or data connectivity to a user. The terminal can communicate with one or more core networks via a radio access network (RAN). The terminal 140 can be a mobile terminal, such as a mobile phone (or referred as a "cellular" phone) and a computer with the mobile terminal. For example, the terminal 140 can be a portable, pocket, handheld, computer built-in or in-vehicle mobile device, such as a subscriber unit a subscriber station, a mobile station, a mobile, a remote station, an access point, a remote terminal, an access terminal, a user terminal, a user agent, a user device, or user equipment.

A method for detecting a synchronization signal block and a method for transmitting synchronization signal block provided by various embodiments of the present disclosure involve in a process for enabling the terminal 140 initially to access the access network device 120.

It should be noted that, in the mobile communication system shown in FIG. 1, a plurality of access network devices 120 and/or a plurality of terminals 140 may be included, and FIG. 1 shows an example where one access network device 120 and one terminal 140 are included, and embodiments of the present do not impose specific limitations on this.

In the 5G system, in order to make a terminal that enters a range of a cell successfully completes access, the access network device needs to periodically transmit a synchronization signal block (SS Block). After the terminal that enters the range of the cell receives the synchronization signal block, that is, detects the synchronization signal block, a location of a time-frequency of the synchronization signal (including a primary synchronization signal and a secondary synchronization signal) in the synchronization signal block is determined, and then the synchronization is completed according to the synchronization signal. Further, the terminal determines the time-frequency location of a synchronization channel in the synchronization signal block, and then detects and demodulates the synchronization channel, and finally completes cell access according to information carried in the synchronization channel (usually including system information).

Different from the LTE system, the terminal and the access network device in the 5G system both use a high frequency band of 6 GHz or higher for signal transmission, the high frequency signal has the characteristics of large attenuation and poor coverage. Therefore, in order to ensure quality of the terminal access, the access network device in the 5G system transmits the synchronization signal blocks by means of beam scanning. Correspondingly, the terminal receives the synchronization signal blocks transmitted by the access network device by means of a receiving beam, and then completes the access according to the synchronization signal blocks.

Figure 2:
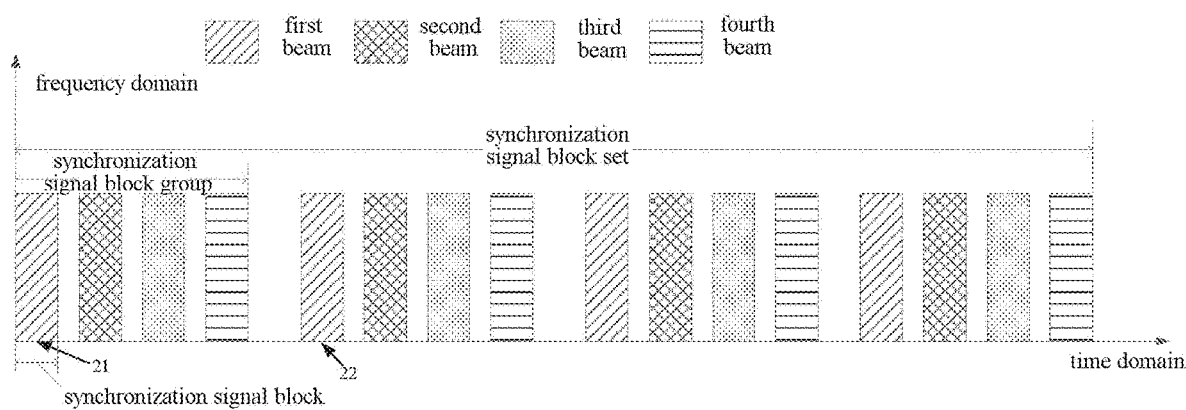
FIG. 2 is a schematic diagram of an access network device transmitting a synchronization signal block by using beam scanning.

For example, as shown in FIG. 2, for a cell covered by an access network device (such as a 120° sector), the access network device uses four different beams to transmit the synchronization signal block. For example, a first beam is configured to scan a 0° to 30° region, a second beam is configured to scan a 30° to 60° region, a third beam is configured to scan a 60° to 90° region, and a fourth beam is configured to scan a 90° to 120° region. The synchronization signal blocks transmitted by using four different beams constitute a synchronization signal block group; and in order to improve the terminal access rate, the access network device can repeatedly transmit the same synchronization signal block group (the access network device repeatedly transmits the group 3 times in FIG. 2). At least one synchronization signal block group may constitute a synchronization signal block set, and the synchronization signal block set is periodically transmitted. In addition, information carried in the synchronization signal blocks transmitted by using different beams may be different. For example, the synchronization channels in different synchronization signal blocks carry different beam IDs, control channel information, and the like.

In order to improve the detection performance for the synchronization signal blocks, the terminal can perform joint detection of the synchronization signal blocks carrying the same information. For example, as shown in FIG. 2, the terminal may perform joint detection of the synchronization signal blocks transmitted by the first beam (the information carried by the synchronization signal blocks transmitted by the same beam is same) in the first synchronization signal block group and the second synchronization signal block group. However, since the terminal cannot know which synchronization signal blocks carry the same information and which synchronization signal blocks carry different information, the terminal cannot perform joint detection of the synchronization signal blocks, thereby affecting the detection performance for the synchronization signal blocks and the access efficiency of the terminal.

In order to solve the above problem, in various embodiments of the present disclosure, the access network device adds the preset information into the synchronization signal block. After receiving the synchronization signal block, the terminal can determine, according to the preset information and the location of the time-frequency resource of the current synchronization signal block, other synchronization signal blocks which carry the same information as that of the synchronization signal block or are sent using the same beam as the synchronization signal block. Thus, the present disclosure can perform joint detection of these synchronization signal blocks (i.e., the current synchronization signal block and the other synchronization blocks), thereby improving the detection performance of the synchronization signal blocks and the access efficiency of the terminal. The present disclosure will be described as follows with illustrative embodiments.

Figure 3:
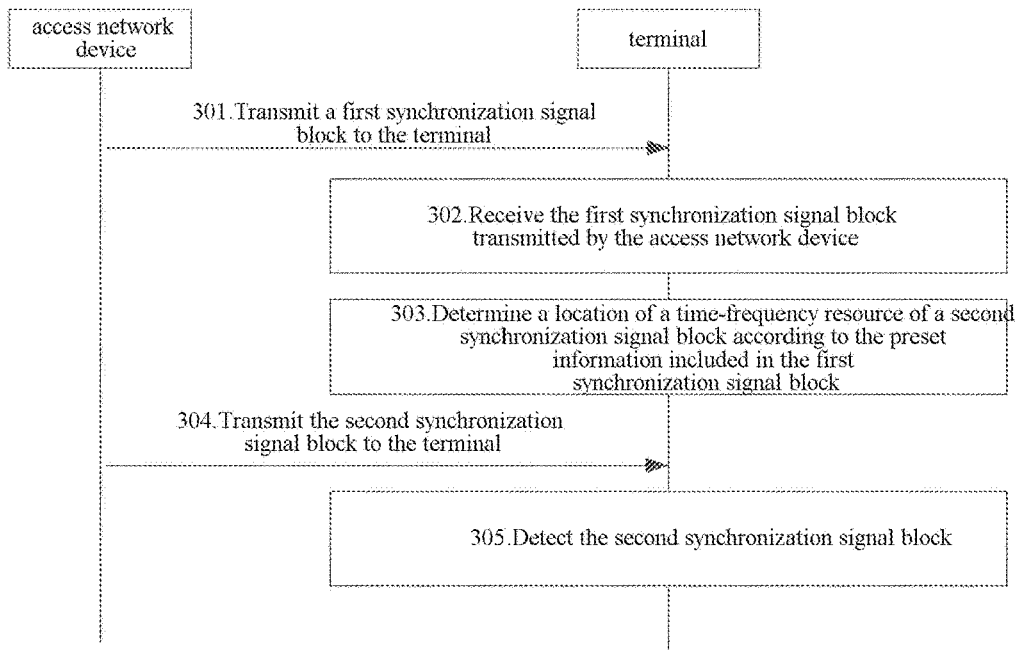
FIG. 3 is a flowchart of a method for detecting a synchronization signal block according to an embodiment of the present disclosure.

FIG. 3 is a flowchart of a method for detecting a synchronization signal block according to an embodiment of the present disclosure. As an example, the method for detecting a synchronization signal block is applied to the mobile communication system shown in FIG. 1. The method includes the following steps:

In Step 301, the access network device transmits a first synchronization signal block to the terminal.

The first synchronization signal block includes at least a first synchronization signal and a first synchronization channel. Optionally, the first synchronization signal includes a primary synchronization signal and a secondary synchronization signal, and may further include a beam specific reference signal (BRS); the first synchronization channel is a physical broadcast channel (PBCH).

Before the access network device transmits the first synchronization signal block to the terminal, the preset information is added to the first synchronization signal block. Optionally, the first synchronization signal in the first synchronization signal block includes the preset information, or the first synchronization channel in the first synchronization signal block includes the preset information. Optionally, the access network device uses different synchronization sequences to indicate different preset information.

In Step 302, the terminal receives the first synchronization signal block transmitted by the access network device.

Optionally, the terminal has at least one beam receiving direction, and the terminal that enters the cell covered by the access network device can receive the first synchronization signal block from the at least one beam receiving direction.

In Step 303, the terminal determines a location of a time-frequency resource of a second synchronization signal block according to the preset information included in the first synchronization signal block. The first synchronization signal block and the second synchronization signal block are sent using the same beam, or the first synchronization signal block and the second synchronization signal block carry the same information.

Optionally, the terminal obtains the preset information from the synchronization signal in the first synchronization signal block, or obtains the preset information from the first synchronization channel in the first synchronization signal block.

Optionally, the preset information included in the first synchronization signal block includes at least one of the following.

1. A total amount of different beams used when the access network device transmits the synchronization signal block(s)

As an example, as shown in FIG. 2, the access network device transmits a total of 16 synchronization signal blocks in a synchronization signal block set, and uses four different beams, so the total amount of beams is 4.

2. A transmission period of the synchronization signal block(s)

The transmission period of the synchronization signal block(s) is the length of time between the transmissions of two adjacent synchronization signal blocks. The transmission period is in unit of a sub frame, a slot, a mini slot, an OFDM symbol, or the transmission period is an absolute time.

3. A transmission period of the synchronization signal block set where the first synchronization signal block is located Each synchronization signal block set includes a plurality of synchronization signal blocks. The synchronization signal block set is periodically transmitted, and the synchronization signal blocks transmitted in the transmission periods of different synchronization signal block sets and the beams used are identical. For example, the synchronization signal block set shown in FIG. 2 includes at least one group of synchronization signal blocks, and each synchronization signal block in each group of synchronization signal blocks can be transmitted by using different beams.

As an example, the transmission period of the synchronization signal block set(s) is the length of time between the transmissions of two adjacent sets of synchronization signal blocks. The transmission period is in unit of a sub frame, a slot, a mini slot, an OFDM symbol, or the transmission period is an absolute time.

4. A total amount of the synchronization signal blocks in the synchronization signal block set where the first synchronization signal block is located The synchronization signal block set includes at least one group of synchronization signal blocks, and synchronization signal blocks in each group of synchronization signal blocks may be transmitted by using different beams.

As an example, as shown in FIG. 2, the synchronization signal block set where the first synchronization signal block is located includes a total of 16 synchronization signal blocks, and the total amount of the synchronization signal blocks is 16.

5. A first time domain index of the first synchronization signal block

The first time domain index indicates the time domain location of the first synchronization signal block.

6. A frequency domain interval between the first synchronization signal block and the second synchronization signal block When the access network device transmits the synchronization signal blocks in a frequency division multiplexing manner, frequency domain resources occupied by the first synchronization signal block and the second synchronization signal block may be different. Therefore, in a possible implementation, the preset information in the first synchronization signal block further includes the frequency domain interval between the first synchronization signal block and the second synchronization signal block. The frequency domain interval is the number of physical resource blocks (PRB), the number of sub-bands or bandwidth, and the like.

After receiving the first synchronization signal block, the terminal determines a frequency domain location of the second synchronization signal block according to the frequency domain location of the first synchronization signal block and the frequency domain interval.

As an example, when the frequency domain interval included in the preset information of the first synchronization signal block is 60 kHz (bandwidth) and the frequency domain location of the first synchronization signal block is 1000 kHz, the frequency domain location of the second synchronization signal block is 1060 kHz. In Step 304, the access network device transmits the second synchronization signal block to the terminal.

The access network device transmits the second synchronization signal block by using the same beam as that of the first synchronization signal block. Optionally, the information carried by the first synchronization signal block is the same as the information carried in the second synchronization signal block.

As an example, as shown in FIG. 2, after transmitting the first synchronization signal block 21 (located in the first synchronization signal block group) to the terminal by using the first beam, the access network device transmits the second synchronization signal block 22 (located in the second synchronization signal block group) to the terminal by using the first beam.

In Step 305, the terminal detects the second synchronization signal block.

After receiving the second synchronization signal block at the determined time domain location, the terminal detects the second synchronization signal block.

For the detection process of the second synchronization signal block, in a possible implementation, the terminal performs a joint detection of the first synchronization signal in the first synchronization signal block and the second synchronization signal in the second synchronization signal block, thereby improving the demodulation performance of the terminal with regard to the synchronization signals.

In another possible implementation, the terminal performs a joint detection of the first synchronization channel in the first synchronization signal block and the second synchronization channel in the second synchronization signal block, thereby improving the demodulation performance of the terminal with regard to the synchronization signals.

Optionally, when performing the joint detection of the first synchronization channel and the second synchronization channel, the terminal combines soft bits in the first synchronization channel and the second synchronization channel to improve the detection performance.

In another possible implementation, the terminal detects the second synchronization signal block by using a receiving beam different from that of the first synchronization signal block.

As an example, the terminal has two types of receiving beams (corresponding to different beam receiving directions). After the terminal detects the first synchronizing signal block by using a first receiving beam, and determines the time domain location of the second synchronizing signal block according to the preset information in the first synchronizing signal block, the terminal detects the second synchronization signal block by using a second receiving beam. Further, according to the detection results of the first synchronization signal block and the second synchronization signal block, the terminal determines the receiving beam corresponding to the optimal detection result as a target receiving beam, and receives a downlink signal by using the target receiving beam during the process of receiving the downlink signal subsequently. In summary, in the method for detecting a synchronization signal block provided by the embodiment, the access network device adds the preset information to the synchronization signal block, so that after the terminal receives the synchronization signal block, the terminal can determine, according to the preset information, the time-frequency resource locations of other synchronization signal blocks which carry the same information as the current synchronization signal block or other synchronization blocks that are transmitted by using the same beam as that of the current synchronization signal block. Thus, the embodiment can implement joint detection of two synchronization signal blocks, and improve the detection performance of the terminal with regard to the synchronization signal blocks.

In this embodiment, the terminal receives the first synchronization signal block and the second synchronization signal block by using different receiving beams to determine the target receiving beam with the best receiving quality, and then the target receiving beam is used to receive the subsequent downlink signals, and thus the receiving quality of the downlink signals is improved.

For the different types of preset information in the synchronization signal block, the terminal may use a corresponding determination mode for the time domain location, and determine the time domain location of the second synchronization signal block in view of the time domain location of the first synchronization signal block, and then detect the second synchronization signal block. In the embodiment shown in FIG. 4, the preset information includes the total amount of beams and/or a transmission period of the synchronization signal block. In the embodiment shown in FIG. 5A, the preset information includes a transmission period of the synchronization signal block set where the first synchronization signal block is located. In the embodiment shown in FIG. 6, the preset information includes the total amount of the synchronization signal blocks in the synchronization signal block set where the first synchronization signal block is located. In the embodiment shown in FIG. 7, the preset information includes the first time domain index of the first synchronization signal block.

Figure 4:
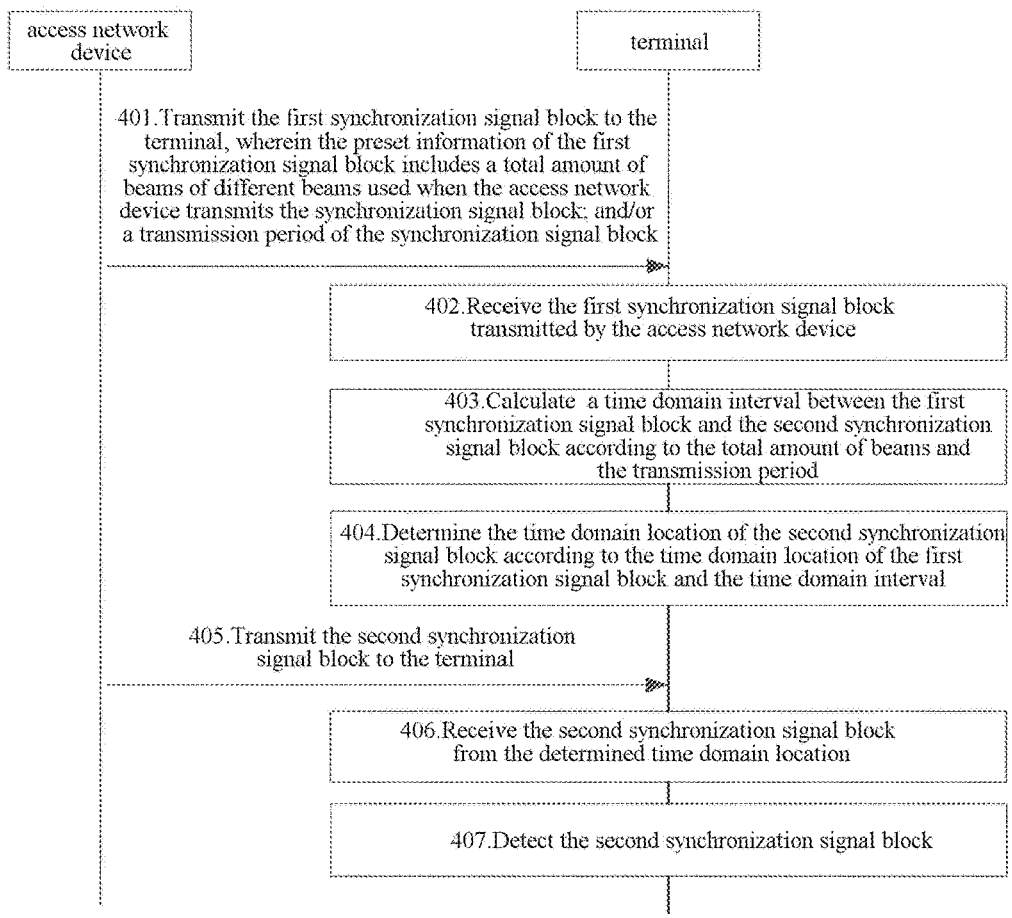
FIG. 4 is a flowchart of a method for detecting a synchronization signal block according to an embodiment of the present disclosure.

FIG. 4 is a flowchart of a method for detecting a synchronization signal block according to another embodiment of the present disclosure. As an example, the method for detecting a synchronization signal block may be applied to the mobile communication system shown in FIG. 1. The method includes the following steps:

In Step 401, the access network device transmits the first synchronization signal block to the terminal. The preset information in the first synchronization signal block includes a total amount of different beams used when the access network device transmits synchronization signal blocks; and/or a transmission period of synchronization signal blocks.

In a possible implementation, the access network device adds corresponding preset information to the first synchronization signal block based on the pre-agreed parameters in a protocol, so that the terminal can determine the time domain location of the second synchronization signal block according to the preset information and the pre-agreed parameters.

Optionally, when the transmission period of the synchronization signal blocks is pre-agreed in the protocol (the total amount of beams may be set by the access network device according to its own configuration), the preset information in the first synchronization signal block includes the total amount of different beams which the current access network device uses when transmitting synchronization signal blocks.

When the total amount of different beams used when the access network device transmits the synchronization signal blocks is pre-agreed in the protocol (the transmission period can be set by the access network device), the transmission period of the synchronization signal blocks is included in the preset information in the first synchronization signal block.

When the total amount of beams and the transmission period are not pre-agreed in the protocol, the total amount of beams and the transmission period are both included in the preset information.

As an example, as shown in FIG. 2, when the transmission period of the synchronization signal blocks is pre-agreed in the protocol as M OFDM symbols, since the access network device uses four different beams when transmitting the synchronization signal blocks, the preset information in the first synchronization signal block includes the total amount of beams, i.e., N=4.

In Step 402, the terminal receives the first synchronization signal block transmitted by the access network device.

The implementation of this step is similar to the foregoing step 302, and details are not described herein again.

In Step 403, the terminal calculates a time domain interval between the first synchronization signal block and the second synchronization signal block according to the total amount of beams and the transmission period.

The time domain interval is at least one of the number of sub-frames, the number of slots, the number of mini-slots, or the number of orthogonal frequency division multiplexing (OFDM) symbols.

In a possible implementation, the terminal calculates the time domain interval according to the total amount of beams included in the preset information and the pre-agreed transmission period of synchronization signal blocks.

For example, if the total amount of beams included in the preset information obtained by the terminal is 4 and the pre-agreed transmission period of the synchronization signal blocks is 8 OFDM symbols, the time domain interval between the first synchronization signal block and the second synchronization signal block is 4×8=32 OFDM symbols.

In another possible implementation, the terminal calculates the time domain interval according to the transmission period included in the preset information and the pre-agreed total amount of beams.

In Step 404, the terminal determines the time domain location of the second synchronization signal block according to the time domain location of the first synchronization signal block and time domain interval.

Further, the terminal determines the time domain location of the second synchronization signal block according to the calculated time domain interval and the time domain location of the first synchronization signal block.

As an example, as shown in FIG. 2, the time domain interval calculated by the terminal according to the total amount of beams and the transmission period is: the time domain interval between the first synchronization signal block 21 in the first synchronization signal block group and the second synchronization signal block 22 in the second synchronization signal block group. Therefore, the terminal can determine the time domain location of the second synchronization signal block 22 if the time domain location of the first synchronization signal block 21 and the time domain interval are known.

In Step 405, the access network device transmits the second synchronization signal block to the terminal.

The implementation of this step is similar to the foregoing step 304, and details are not described herein again.

In Step 406, the terminal receives the second synchronization signal block from the determined time domain location.

Specifically, the terminal receives the synchronization signal block at the time domain location according to the determined time domain location of the second synchronization signal block. The first synchronization signal block and the second synchronization signal block are transmitted by using the same beam, or carry the same information.

In Step 407, the terminal detects the second synchronization signal block.

The implementation of this step is similar to the foregoing step 305, and details are not described herein again.

In summary, in the method for detecting the synchronization signal block provided by the embodiment, the access network device adds the preset information to the synchronization signal block. After the terminal receives the synchronization signal block, the terminal can determine, according to the preset information, the location of a time-frequency resource of other synchronization signal blocks which carry the same information as that of the synchronization signal block or are sent using the same beam as the synchronization signal block. Thus, the present disclosure can perform joint detection of two synchronization signal blocks, thereby improving the terminal's detection performance on the synchronization signal block.

Figure 5A:
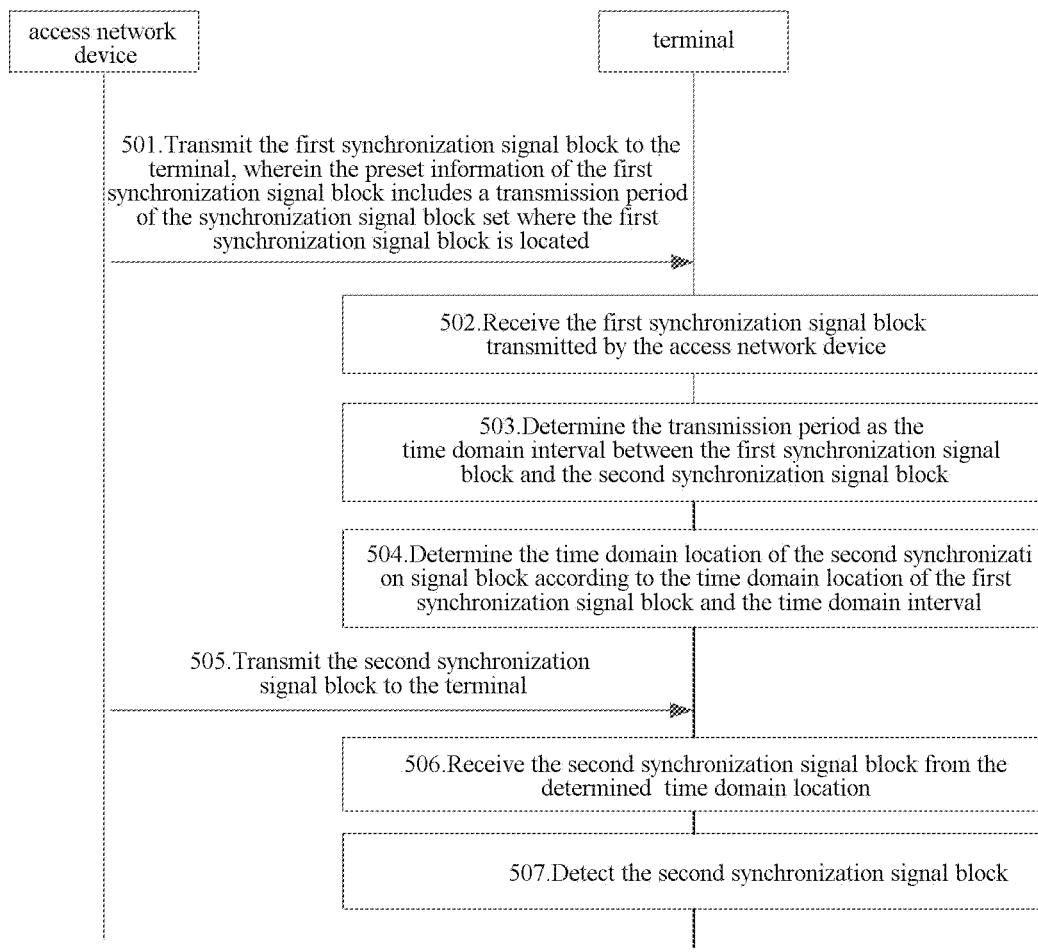
FIG. 5A is a flowchart of a method for detecting a synchronization signal block according to an embodiment of the present disclosure.

FIG. 5A shows a flowchart of a method for detecting a synchronization signal block according to another embodiment of the present disclosure. As an example, the synchronization signal block detecting method is applied to the mobile communication system shown in FIG. 1. The method includes the following steps:

In Step 501, the access network device transmits the first synchronization signal block to the terminal. The preset information in the first synchronization signal block includes a transmission period of the synchronization signal block set where the first synchronization signal block is located.

In a possible implementation, in the synchronization signal block set transmitted by the access network device, the synchronization signal blocks are transmitted after using different beamforming manners, or the information carried by synchronization signal blocks is different (i.e., the synchronization signal block set includes only one synchronization signal block group). In order to enable the terminal to perform joint detection of the first synchronization signal block and the second synchronization signal block in the two adjacent synchronization signal block sets, the access network device adds the transmission period of the synchronization signal block set to the first synchronization signal block.

Figure 5B:
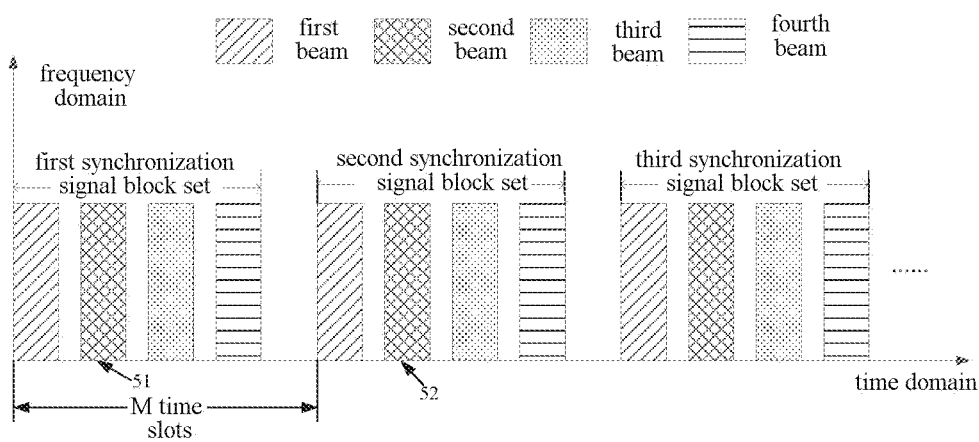
FIG. 5B is a schematic diagram of an access network device periodically transmitting a synchronization signal block set.

As an example, as shown in FIG. 5B, the access network device periodically transmits the synchronization signal block sets, and each of the synchronization signal block sets includes synchronization signal blocks that are beamformed using four types of beams. The synchronization signal block 51 transmitted by the access network device to the terminal includes the transmission period of the first synchronization signal block set which the synchronization signal block 51 is in, and the transmission period is the time domain resource occupied by the complete transmission of the 4 synchronization signal blocks (including the interval between the adjacent synchronization signal blocks). For example, the transmission period is M time slots.

In Step 502, the terminal receives the first synchronization signal block transmitted by the access network device.

In Step 503, the terminal determines the transmission period as the time domain interval between the first synchronization signal block and the second synchronization signal block.

Since the synchronization signal block set is periodically transmitted, and the synchronization signal blocks included in the different synchronization signal block sets are the same, the terminal directly determines the transmission period as the time domain interval between the first synchronization signal block and the second synchronization signal block.

As an example, as shown in FIG. 5B, when the transmission period is M time slots, the time domain interval between the synchronization signal block 51 in the first synchronization signal block set and the synchronization signal block 52 in the second synchronization signal block set is M time slots.

In Step 504, the terminal determines the time domain location of the second synchronization signal block according to the time domain location of the first synchronization signal block and the time domain interval.

Similarly to the above step 404, the terminal determines the time domain location of the second synchronization signal block in the adjacent synchronization signal block sets according to the time domain location of the first synchronization signal block and the time domain interval.

In Step 505, the access network device transmits the second synchronization signal block to the terminal.

In Step 506, the terminal receives the second synchronization signal block from the determined time domain location.

In Step 507, the terminal detects the second synchronization signal block.

The implementation of the foregoing steps 505 to 507 is similar to the steps 405 to 407, and details are not described herein again.

Figure 6:
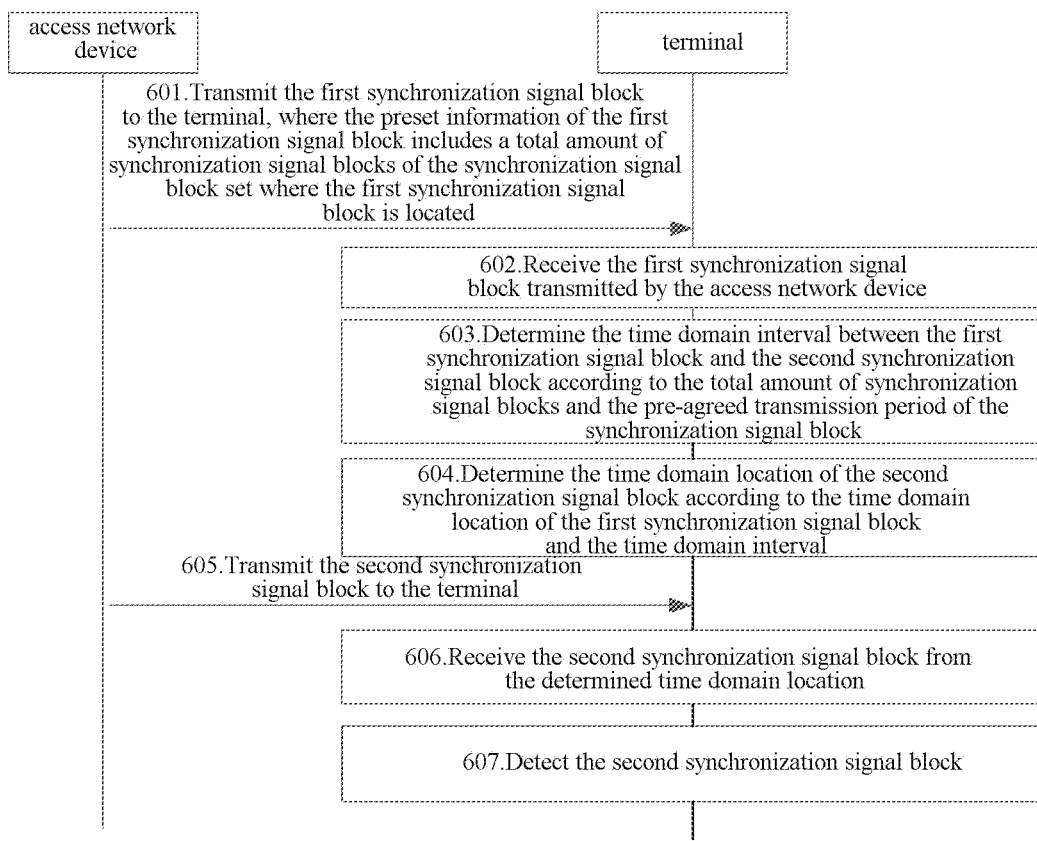
FIG. 6 is a flowchart of a method for detecting a synchronization signal block according to an embodiment of the present disclosure.

FIG. 6 is a flowchart of a method for detecting a synchronization signal block according to still another embodiment of the present disclosure. As an example, the synchronization signal block detecting method is applied to the mobile communication system shown in FIG. 1. The method includes the following steps:

In Step 601, the access network device transmits the first synchronization signal block to the terminal. The preset information in the first synchronization signal block includes a total amount of synchronization signal blocks in the synchronization signal block set where the first synchronization signal block is located.

In the embodiment shown in FIG. 5A, the access network device directly adds the transmission period of the synchronization signal block set to the first synchronization signal block. In another possible implementation, when the transmission period of the synchronization signal block is pre-agreed in the protocol, the access network device may only add the total amount of synchronization signal blocks in the synchronization signal block set to the first synchronization signal block, and the terminal calculates and obtains the transmission period of the synchronization signal block according to the transmission period of the synchronization signal block and the total amount of synchronization signal blocks.

For example, as shown in FIG. 2, the total amount of synchronization signal blocks included in the preset information in the first synchronization signal block is 16; for another example, as shown in FIG. 5B, the total amount of synchronization signal blocks included in the preset information in the first synchronization signal block is 4.

In Step 602, the terminal receives the first synchronization signal block transmitted by the access network device.

In Step 603, the terminal determines the time domain interval between the first synchronization signal block and the second synchronization signal block according to the total amount of synchronization signal blocks and the pre-agreed transmission period of the synchronization signal block.

After receiving the first synchronization signal block, the terminal calculates the transmission period of the synchronization signal block set where the first synchronization signal block is located according to the total amount of synchronization signal blocks and the pre-agreed transmission period of the synchronization signal block, and determines the transmission period as the time domain interval between the first synchronization signal block and the second synchronization signal block in the two adjacent synchronization signal block sets.

As an example, as shown in FIG. 5B, when the total amount of synchronization signal blocks included in the preset information is 4, and the pre-agreed transmission period of the synchronization signal block is 1 time slot, the time domain interval between the synchronization signal block 51 and the synchronization signal block 52 (located in two adjacent synchronization signal block sets) is 4 time slots.

In Step 604, the terminal determines the time domain location of the second synchronization signal block according to the time domain location of the first synchronization signal block and the time domain interval.

In Step 605, the access network device transmits the second synchronization signal block to the terminal.

In Step 606, the terminal receives the second synchronization signal block from the determined time domain location.

In Step 607, the terminal detects the second synchronization signal block.

The implementation of the foregoing steps 605 to 607 is similar to the steps 405 to 407, and details are not described herein again.

Figure 7:
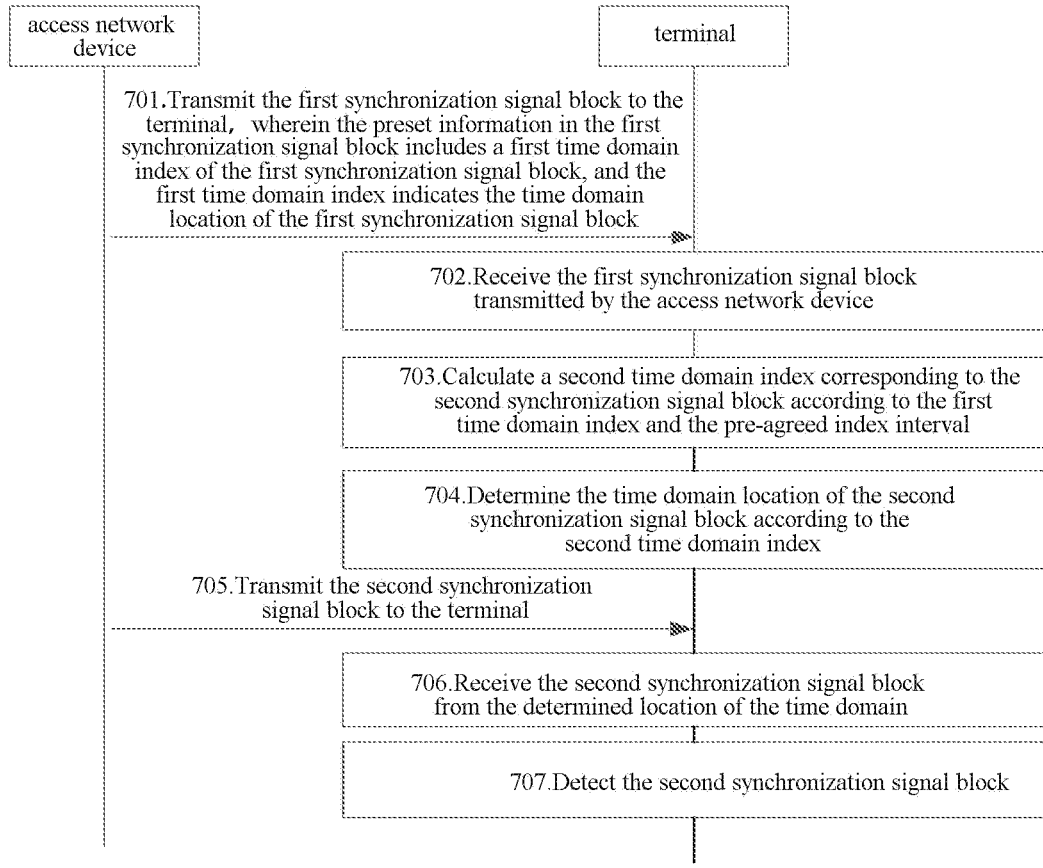
FIG. 7 is a flowchart of a method for detecting a synchronization signal block according to an embodiment of the present disclosure.

FIG. 7 is a flowchart of a method for detecting a synchronization signal block according to still another embodiment of the present disclosure. As an example, the synchronization signal block detecting method is to the mobile communication system shown in FIG. 1. The method includes the following steps:

In Step 701, the access network device transmits the first synchronization signal block to the terminal. The preset information in the first synchronization signal block includes a first time domain index of the first synchronization signal block, where the first time domain index indicates the time domain location of the first synchronization signal block.

In a first possible implementation, the first time domain index is an index of the first synchronization signal block in the synchronization signal block set, and the synchronization signal block set includes at least one synchronization signal block group.

As an example, as shown in FIG. 2, since the synchronization signal block set includes 16 synchronization signal blocks, the time domain indexes of the respective synchronization signal blocks are 0 to 15.

In a second possible implementation, the first time domain index is an index of a time domain resource where the first synchronization signal block is located in a radio frame, a sub-frame, or a time slot. The time domain resource is a sub-frame, a time slot, a mini slot or an OFDM symbol.

For example, when the first synchronization signal block occupies a first sub-frame of to radio frame (including a total of 10 sub-frames), the time domain index of the first synchronization signal block is 0. As another example, when the first synchronization signal block occupies a third sub-frame of the radio frame (including a total of 10 sub-frames), the time domain index of the first synchronization signal block is 2.

In a third possible implementation, the first time domain index is an index of all synchronization signal blocks where the first synchronization signal block is located in a radio frame, a sub-frame, or a time slot.

For example, when a radio frame includes four synchronization signal blocks, and the four synchronization signal blocks occupy the first, third, fifth, and seventh sub-frames, respectively, the time domain index of the synchronization signal block occupying the first sub-frame is 0, the time domain index of the synchronization signal block occupying the third sub-frame is 1, the time domain index of the synchronization signal block occupying the fifth sub-frame is 2, and the time domain index of the synchronization signal block occupying the seventh sub-frame is 3.

It should be noted that, in addition to the foregoing three setting modes of the time domain index, the access network device may also set a time domain index for the synchronization signal block in other possible manners, which is not limited by the present disclosure.

In Step 702, the terminal receives the first synchronization signal block transmitted by the access network device.

In Step 703, the terminal calculates a second time domain index corresponding to the second synchronization signal block according to the first time domain index and the pre-agreed index interval.

The index interval indicates the difference of between the time domain indexes of the synchronization signal blocks transmitted by the same beam, or indicates the difference between the time domain indexes of the synchronization signal blocks carrying the same information.

As an example, as shown in FIG. 2, when the time domain index is an index of the synchronization signal block in the synchronization signal block set, the terminal calculates the second time domain index of the second synchronization signal block 22 as 0+4=4 according to the first time domain index 0 of the first synchronization signal block 21 and the index interval 4 (the four synchronization signal blocks are in a group).

In Step 704, the terminal determines the time domain location of the second synchronization signal block according to the second time domain index.

For example, when the time domain index is an index of the synchronization signal block in the synchronization signal block set, and the second time domain index is calculated as 4, the terminal determines the synchronization signal block corresponding to the time domain index "4" as the second synchronization signal block.

In Step 705, the access network device transmits the second synchronization signal block to the terminal.

In Step 706, the terminal receives the second synchronization signal block from the determined time domain location.

In Step 707, the terminal detects the second synchronization signal block.

The implementation of the foregoing steps 705 to 707 is similar to the steps 405 to 407, and details are not described herein again.

It should be noted that the steps performed by the terminal in the above various embodiments may be separately implemented as the method for detecting the synchronization signal block on the terminal side; and the steps performed by the access network device in the above various embodiments may be separately implemented as the method for transmitting the synchronization signal block on the access network device side.

The following are device embodiments of the present disclosure. For the parts that are not elaborated in the device embodiments, reference may be made to the technical details disclosed in the foregoing method embodiments.

Figure 8:
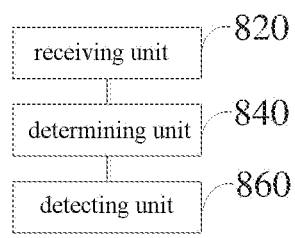
FIG. 8 is a schematic structural diagram of a device for detecting a synchronization signal block according to an embodiment of the present disclosure.

FIG. 8 is a schematic structural diagram of a device for detecting the synchronization signal block according to an embodiment of the present disclosure. The device for detecting the synchronization signal block can be implemented as all or part of the terminal by software, hardware, or a combination of both software and hardware. The device for detecting the synchronization signal block includes: a receiving unit 820, a determining unit 840, and a detecting unit 860.

The receiving unit 820 is configured to implement the foregoing steps 302, 402, 502, 602, and 702 and functions related to the receiving steps.

The determining unit 840 is configured to implement the functions of the foregoing steps 303, 403 to 404, 503 to 504, 603 to 604, and 703 to 704.

The detecting unit 860 is configured to implement the function of the foregoing steps 305, 407, 507, and 607 and functions related to the detecting steps.

In addition, an embodiment of the present disclosure further provides a device for transmitting the synchronization signal block, which can be implemented as all or a part of an access network device by software, hardware, or a combination of both software and hardware. The device for transmitting the synchronization block includes a transmitting unit configured to implement the function of the foregoing steps 301, 304, 401, 405, 501, 505, 601, 605, 701, 705 and functions related to the transmission step.

Figure 9:
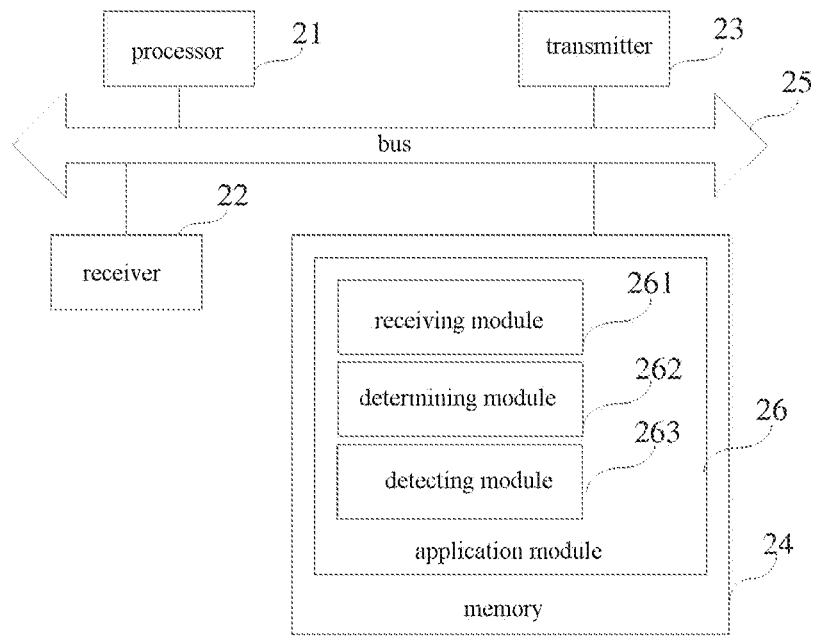
FIG. 9 is a schematic structural diagram of a terminal according to an exemplary embodiment of the present disclosure.

FIG. 9 is a schematic structural diagram of a terminal according to an exemplary embodiment of the present disclosure. The terminal includes a processor 21, a receiver 22, a transmitter 23, a memory 24, and a bus 25.

The processor 21 includes one or more processing cores, and the processor 21 executes various functional applications and information processing by running software programs and modules.

The receiver 22 and the transmitter 23 can be implemented as one communication component. The communication component can be a communication chip, which can include a receiving module, a transmitting module, a modem module, etc., and is configured to modulate and/or demodulate information, and receive or send this information via wireless signals.

The memory 24 is coupled to the processor 21 via the bus 25.

The memory 24 can be configured to store software programs and modules.

The memory 24 can store at least one of the functions described by the application module 26. The application module 26 can include a receiving module 261, a determining module 262, and a detecting module 263.

The processor 21 is configured to execute the receiving module 261 to implement the functions of the steps of receiving the synchronization signal block in the foregoing various method embodiments. The processor 21 is configured to execute the determining module 262 to implement the steps of determining the location of the time-frequency resource in the foregoing various method embodiments. The processor 21 is configured to execute the detecting module 263 to implement the functions of the steps of detecting the synchronization signal block in the foregoing various method embodiments.

Moreover, the memory 24 can be implemented by any type of volatile or non-volatile memory device, or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

Figure 10:
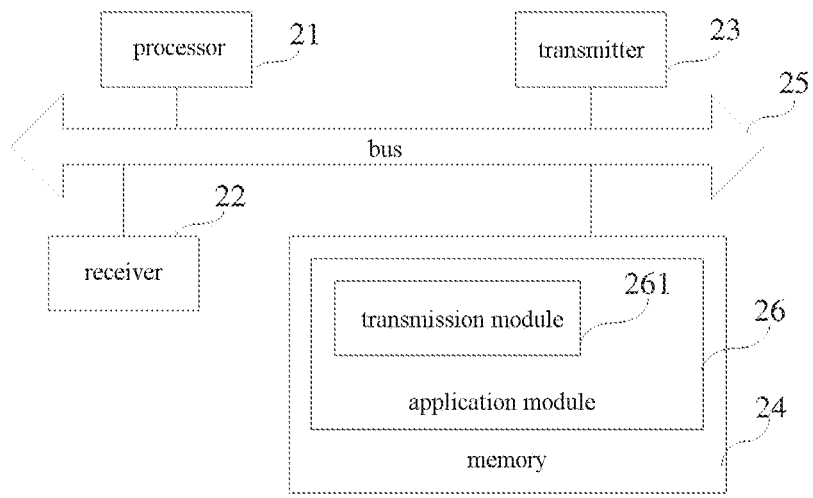
FIG. 10 is a schematic structural diagram of an access network device according to an exemplary embodiment of the present disclosure.

FIG. 10 is a schematic structural diagram of an access network device according to an exemplary embodiment of the present disclosure. The access network device includes: a processor 21, a receiver 22, a transmitter 23, a memory 24, and a bus 25.

The processor 21 includes one or more processing cores, and the processor 21 executes various functional applications and information processing by running software programs and modules.

The receiver 22 and the transmitter 23 can be implemented as one communication component. The communication component can be a communication chip, which can include a receiving module, a transmitting module, a modem module, etc., and is configured to modulate and/or demodulate information, and receive or send this information via wireless signals.

The memory 24 is coupled to the processor 21 via the bus 25.

The memory 24 can be configured to store software programs and modules.

The memory 24 can store an application module 26 as described by at least one of the functions. The application module 26 can include a transmission module 261.

The processor 21 is configured to execute the transmission module 261 to implement the functions of the steps of transmitting the synchronization signal block in the foregoing various method embodiments.

Moreover, the memory 24 can be implemented by any type of volatile or non-volatile memory device, or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

Those skilled in the art should appreciate that in one or more of the above examples, the functions described in the embodiments of the present disclosure may be implemented in hardware, software, firmware, or any combination thereof. When the functions are implemented by the software, the functions may be stored in a computer readable medium or transmitted as one or more instructions or code on the computer readable medium. The computer readable medium includes the computer storage medium and the communication medium, wherein the communication medium includes any medium that facilitates the transmission of the computer program from one location to another. The storage medium may be any available medium that can be accessed by a general purpose or special purpose computer.

Exemplary embodiments of the present disclosure are described above, and however the embodiments are not intended to limit the present disclosure. Any modifications, equivalent substitutions, improvements, etc., which are within the spirit and scope of the present disclosure, should be included in the protection scope of the present disclosure.

What is claimed is:

1. A terminal device, comprising:
   a receiver configured to receive a first synchronization signal block transmitted by an access network device, wherein the first synchronization signal block comprises a physical broadcast channel (PBCH), a primary synchronization signal (PSS), and a secondary synchronization signal (SSS); and
   a processor configured to determine a location of a frequency resource of a second synchronization signal block according to preset information comprised in the physical broadcast channel (PBCH), wherein the second synchronization signal block comprises a physical broadcast channel (PBCH), a primary synchronization signal (PSS), and a secondary synchronization signal (SSS);
   wherein the preset information comprises a frequency domain interval between the first synchronization signal block and the second synchronization signal block;
   wherein the processor is configured to:
      determine a frequency domain location of the second synchronization signal block according to a frequency domain location of the first synchronization signal block and the frequency domain interval between the first synchronization signal block and the second synchronization signal block.

2. The terminal device according to claim 1, wherein the processor is configured to detect the second synchronization signal block.

3. A terminal device, comprising:
   a receiver configured to receive a first synchronization signal block transmitted by an access network device; wherein the first synchronization signal block comprises a primary synchronization signal (PSS), a secondary synchronization signal (SSS) and a synchronization channel; and
   a processor configured to determine a location of a time-frequency resource of a second synchronization signal block according to preset information comprised in the first synchronization signal block, wherein the first synchronization signal block and the second synchronization signal block are sent using a same beam.

4. The terminal device according to claim 3, wherein the processor is configured to detect the second synchronization signal block.

5. The terminal device according to claim 3, wherein the preset information comprises:
   a transmission period of synchronization signal blocks.

6. The terminal device according to claim 3, wherein the preset information comprises a transmission period of a synchronization signal block set in which the first synchronization signal block is located.

7. The terminal device according to claim 6, wherein the first synchronization signal block set comprises at least one group of synchronization signal blocks.

8. The terminal device according to claim 7, wherein the processor is configured to:
   determine the transmission period as a time domain interval between the first synchronization signal block and the second synchronization signal block.

9. The terminal device according to claim 8, wherein the time domain interval is at least one of a number of subframes, number of slots, number of mini-slots, or number of orthogonal frequency division multiplexing (OFDM) symbols.

10. The terminal device according to claim 8, wherein the processor is further configured to:
    determine a time domain location of the second synchronization signal block according to the time domain interval and a time domain location of the first synchronization signal block.

11. The terminal device according to claim 3, wherein the preset information comprises a first time domain index of the first synchronization signal block, and the first time domain index indicates a time domain location of the first synchronization signal block.

12. The terminal device according to claim 11, wherein the first time domain index is an index of the first synchronization signal block in a synchronization signal block set.

13. The terminal device according to claim 12, wherein the synchronization signal block set comprises at least one group of synchronization signal blocks, and a time domain resource is a sub-frame, a time slot, a mini-slot or an orthogonal frequency division multiplexing OFDM symbol.

14. The terminal device according to claim 11, wherein the first time domain index is an index of synchronization signal block among all synchronization signal blocks located in a radio frame, a sub-frame, or a time slot where the first synchronization signal block is located in.

15. The terminal device according to claim 11, wherein the processor is further configured to:
perform joint detection of a first synchronization signal in the first synchronization signal block and a second synchronization signal in the second synchronization signal block.

16. The terminal device according to claim 11, wherein the processor is further configured to:
perform joint detection of a first synchronization channel in the first synchronization signal block and a second synchronization channel in the second synchronization signal block.

17. The terminal device according to claim 11, wherein the processor is configured to:
calculate a second time domain index corresponding to the second synchronization signal block according to the first time domain index and a pre-agreed index interval.

18. The terminal device according to claim 17, wherein the processor is further configured to:
determine a time domain location of the second synchronization signal block according to the second time domain index.

19. A network device, comprising:
a transmitter configured to transmit a first synchronization signal block to a terminal, wherein the first synchronization signal block comprises a physical broadcast channel (PBCH), a primary synchronization signal (PSS), and a secondary synchronization signal (SSS), and
a processor configured to determine a location of a frequency resource of a second synchronization signal block according to preset information comprised in the PBCH;
wherein the transmitter is further configured to transmit the second synchronization signal block to the terminal;
wherein the preset information comprises a frequency domain interval between the first synchronization signal block and the second synchronization signal block;
wherein the processor is configured to:
determine a frequency domain location of the second synchronization signal block according to a frequency domain location of the first synchronization signal block and the frequency domain interval between the first synchronization signal block and the second synchronization signal block.

* * * * *